(12) United States Patent
Sottiaux et al.

(10) Patent No.: US 11,415,173 B2
(45) Date of Patent: Aug. 16, 2022

(54) ELASTOMERIC BEARING HAVING REDUCED-WEIGHT END CAP

(71) Applicant: Aktiebolaget SKF, Gothenburg (SE)

(72) Inventors: Daniel P. Sottiaux, Flower Mound, TX (US); Jeffrey L. George, Saint Charles, IL (US); Derek R. Wright, Hampshire, IL (US)

(73) Assignee: AKTIEBOLAGET SKF, Gothenburg (SE)

( * ) Notice: Subject to any disclaimer, the term of this patent is extended or adjusted under 35 U.S.C. 154(b) by 382 days.

(21) Appl. No.: 16/162,837

(22) Filed: Oct. 17, 2018

(65) Prior Publication Data
US 2020/0124097 A1   Apr. 23, 2020

(51) Int. Cl.
*F16C 33/20* (2006.01)
*F16C 17/10* (2006.01)

(52) U.S. Cl.
CPC .............. *F16C 33/20* (2013.01); *F16C 17/10* (2013.01); *F16C 2208/36* (2013.01)

(58) Field of Classification Search
CPC ....... F16C 11/08; F16C 11/083; F16C 11/086; F16C 23/02; F16C 23/04; F16C 2326/43; B64C 27/001; B64C 27/35
See application file for complete search history.

(56) References Cited

U.S. PATENT DOCUMENTS

| | | | |
|---|---|---|---|
| 4,142,833 A | 3/1979 | Rybicki et al. | |
| 4,263,243 A | 4/1981 | Wilson et al. | |
| 7,097,169 B2 | 8/2006 | Mueller | |
| 10,330,168 B2 * | 6/2019 | Tyan | B60R 19/34 |
| 2013/0284320 A1 * | 10/2013 | Asada | B22D 25/02 148/522 |
| 2014/0193111 A1 * | 7/2014 | Kenmochi | F16C 33/3887 384/572 |
| 2015/0239555 A1 * | 8/2015 | Foskey | B64C 27/35 416/134 A |
| 2017/0002866 A1 * | 1/2017 | Krebs | F16C 33/60 |
| 2017/0097042 A1 * | 4/2017 | Hosaka | F16C 29/0602 |

(Continued)

FOREIGN PATENT DOCUMENTS

| | | |
|---|---|---|
| DE | 102016221840 A1 | 5/2018 |
| EP | 2778057 A2 | 9/2014 |
| GB | 2521397 A | 6/2015 |

OTHER PUBLICATIONS

Written Opinion and Search Report from the French Patent Office dated Jun. 30, 2021 in related French application No. FR1911388, and translation thereof.

*Primary Examiner* — Alan B Waits
(74) *Attorney, Agent, or Firm* — J-Tek Law PLLC; Scott T. Wakeman; Mark A. Ussai

(57) ABSTRACT

An elastomeric bearing includes a first race having an axis of rotation, a second race coaxially arranged relative to the first race and spaced from the first race by a gap, a bearing body in the gap connecting the first race to the second race, the bearing body comprising a plurality of first laminae coaxial with the first race and a plurality of second laminae coaxial with the first race, the first laminae being formed from a different material than the second laminae, and a metal end cap connected to the first race or to the second race. The metal end cap includes an at least partially hollow interior and/or is formed by an additive manufacturing process.

14 Claims, 5 Drawing Sheets

(56) References Cited

U.S. PATENT DOCUMENTS

| | | |
|---|---|---|
| 2017/0159709 A1 | 6/2017 | Allred et al. |
| 2017/0297691 A1* | 10/2017 | Nussenblatt ............ B64C 27/35 |
| 2018/0072409 A1 | 3/2018 | Foskey et al. |
| 2018/0207726 A1* | 7/2018 | Robrecht .................. B22F 5/10 |
| 2018/0216658 A1* | 8/2018 | Brown .................... F16C 7/023 |
| 2019/0032491 A1* | 1/2019 | Nissen ................. B29C 64/386 |

\* cited by examiner

ELASTOMERIC BEARING HAVING REDUCED-WEIGHT END CAP

TECHNOLOGICAL FIELD

The present disclosure is directed to an elastomeric bearing having a reduced-weight end cap and, more specifically, to an elastomeric bearing having and end cap formed with an at least partially hollow interior and/or by an additive manufacturing process.

BACKGROUND

Elastomeric bearings conventionally include a first race connected to a second race by a bearing body, and the bearing body is formed from alternating layers of a metal, such as stainless steel or titanium, and an elastomer. The first race may be an inner race disposed coaxially inside the second or outer race such that the alternating layers of the bearing body comprise coaxial cylinders with radii that increase from the inner ring to the outer ring. Alternately, the first race may be coaxially aligned with and axially spaced from the second race. In this case, the alternating layers of the bearing body comprise a stack of coaxial disks having substantially identical radii that extend from and connect the first and second races. When one race is fixed, the presence of the elastomer layers between the metal layers allows the second race to rotate around the common axis of the bearing by a few degrees or up to, in some cases, as much as 10 degrees, while substantially preventing the first race and second race from moving axially or radially relative to one another.

Elastomeric bearings have many uses, one of which is in a rotor assembly of a rotary wing aircraft. In this environment, the elastomeric bearing may connect a rotor blade to a support in a manner that allows the rotor blade to pivot up and down while limiting movement of the rotor blade in other directions. These bearings may be subjected to axial loads (axial relative to the bearing but in the radial direction of the aircraft rotor) of over 20,000 pounds when the rotor rotates and therefore must be constructed from materials that can withstand these forces. Additional information concerning elastomeric bearings and their use in rotary wing aircraft can be found, for example, in U.S. Pat. No. 7,097,169 to Mueller, the contents of which are hereby incorporated by reference.

It is desirable in many fields, including the field of rotary wing aircraft, to reduce weight in order to obtain improved performance and/or fuel efficiency. However, in view of the stresses experienced by the elastomeric bearings that support aircraft rotors, the weight reduction cannot come at the expense of strength or durability. Thus, for example, attempts have been made to reduce the weight of an elastomeric bearing for rotary wing aircraft by replacing the stainless steel layers in an elastomeric bearing with aluminum layers. While this change does reduce weight, a bearing with aluminum laminae lacks the strength to allow it to be used in a bearing for a rotary wing aircraft. That is, if aluminum is used, the bearing would be not be able to withstand the 20,000 pounds or more of axial force produced by the rotating blade. It is also known to use titanium instead of stainless steel, which is about 40% lighter than stainless steel. This arrangement provides a robust bearing but at a cost that is undesirably high for many applications.

It would therefore be desirable to provide an improved, lightweight elastomeric bearing that is sufficiently strong to allow it to be used to support a rotor in a rotary wing aircraft.

SUMMARY

This problem and others are addressed by embodiments of the present disclosure, one aspect of which comprises an elastomeric bearing having a first race having an axis of rotation, a second race coaxially arranged relative to the first race and spaced from the first race by a gap, and a bearing body in the gap connecting the first race to the second race. The bearing body comprises a plurality of first laminae coaxial with the first race and a plurality of second laminae coaxial with the first race, and the first laminae are formed from a different material than the second laminae. The elastomeric bearing also includes a metal end cap connected to the first race or to the second race, and the metal end cap includes an at least partially hollow interior.

Another aspect of the disclosure comprises an elastomeric bearing that includes a first race having an axis of rotation, a second race coaxially arranged relative to the first race and spaced from the first race by a gap, and a bearing body in the gap connecting the first race to the second race. The bearing body comprises a plurality of first laminae coaxial with the first race and a plurality of second laminae coaxial with the first race, and the first laminae are formed from a different material than the second laminae. The elastomeric bearing also includes a metal end cap connected to the first race or to the second race, and the metal end cap is formed by an additive manufacturing process.

A further aspect of the disclosure comprises an elastomeric bearing that includes a first race having an axis of rotation, a second race coaxially arranged relative to the first race and spaced from the first race by a gap, and a bearing body in the gap connecting the first race to the second race. The bearing body comprises a plurality of elastomeric laminae coaxial with the first race and a plurality of carbon fiber reinforced polyether ether ketone laminae coaxial with the first race. The elastomeric bearing also includes a metal end cap connected to the first race or to the second race, and the metal end cap is formed by laser sintering. The end cap comprises an annular upper support member, an annular lower support member and a plurality of struts extending from the upper support member to the lower support member, and the plurality of struts are not perpendicular to the annular upper support and are not perpendicular to the annular lower support. The annular upper support member has an external diameter smaller than the external diameter of the annular lower support member. Also, the annular lower support member is located between the annular upper support member and the plurality of first laminae

BRIEF DESCRIPTION OF THE DRAWINGS

These and other aspects of the present disclosure will be better understood after a reading of the following detailed description together with the attached drawings wherein.

DETAILED DESCRIPTION

Figure 1:
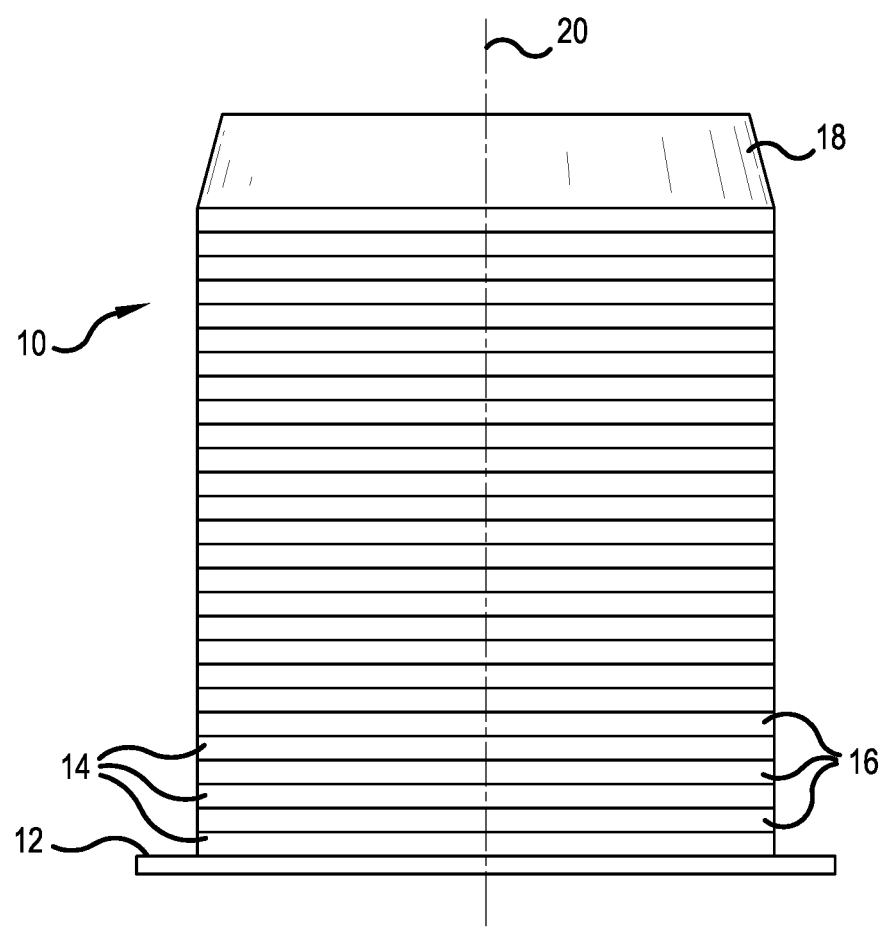
FIG. 1 is side elevational view of an elastomeric bearing having alternating elastomeric laminae and carbon fiber laminae according to a first embodiment of the present disclosure.

Referring now to the drawings, wherein the showings are for the purpose of illustrating embodiments of the disclosure only and not for the purpose of limiting same, FIG. 1 shows an elastomeric bearing 10 comprising a base plate 12, a plurality of elastomeric laminae 14 and a plurality of carbon fiber laminae 16. The carbon fiber laminae 16 comprise carbon fibers embedded in a thermoplastic matrix material, which, in the present embodiment, is or includes polyether ether ketone (PEEK). A suitable material can be obtained from Cytec-Solvay under the trade name APC-2 PEEK. The elastomeric laminae 14 and the carbon fiber laminae 16 have generally similar diameters and are disposed in an alternating (or interleaved) arrangement to form a stack so that, except at each end of the elastomeric bearing 10, an elastomeric lamina 14 is located between pairs of carbon fiber laminae 16 and a carbon fiber lamina 16 is located between pairs of elastomeric laminae 14. An end cap 18 is mounted at the end of the elastomeric bearing 10 opposite the base plate 18, and the elastomeric bearing 10 has a central axis or axis of rotation 20 around which the end cap 18 can rotate by a few or up to about 10 degrees when the base plate 12 is fixedly mounted to another structure.

Figure 2:
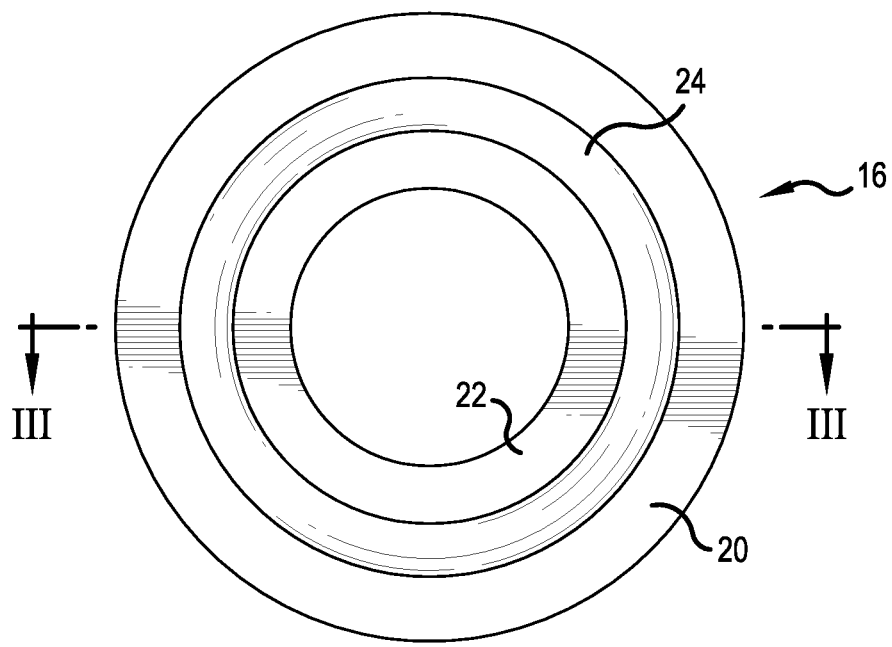
FIG. 2 is a top plan view of one of the carbon fiber laminae of FIG. 1.
Figure 3:
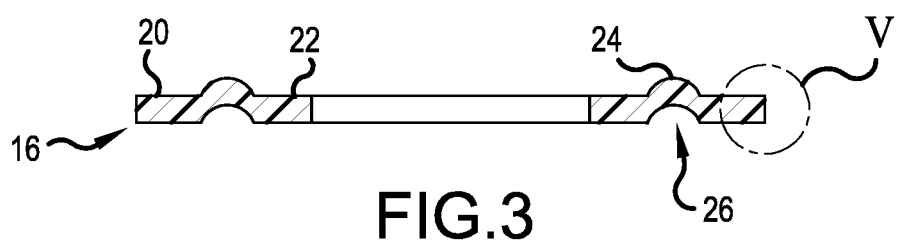
FIG. 3 is a sectional view taken through line III-III in FIG. 2.
Figure 4:
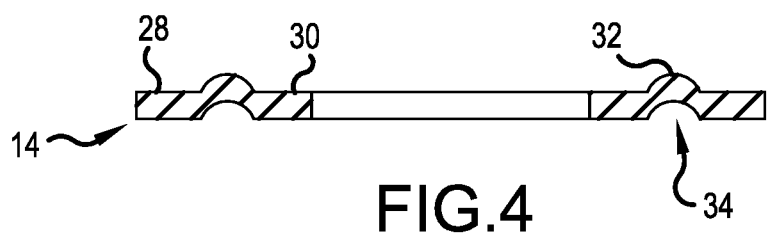
FIG. 4 is a sectional view taken through one of the elastomeric laminae of FIG. 1.

One of the carbon fiber laminae 16 is illustrated by itself in FIGS. 2 and 3 and includes an outer peripheral portion 20 and an inner peripheral portion 22 that lie substantially in the same plane. The carbon fiber lamina 16 also includes an annular convexity 24 on a first side which forms an annular concavity 26 on the opposite side, and the convexity 24 and the concavity 26 are disposed between the outer peripheral portion 20 and the inner peripheral portion 24. One of the elastomeric laminae 14 is illustrated by itself in FIG. 4 and includes an outer peripheral portion 28 and an inner peripheral portion 30 that lie substantially in the same plane. The elastomeric lamina 14 includes an annular convexity 32 on a first side which forms an annular concavity 34 on the opposite side, and the convexity 32 and the concavity 34 are disposed between the outer peripheral portion 28 and the inner peripheral portion 30 of the elastomeric lamina 14.

When the elastomeric laminae 14 and the carbon fiber laminae 16 are stacked, the convexities 32 of the elastomeric laminae 14 project into the concavities 26 of the carbon fiber laminae 16, and the convexities 24 of the carbon fiber laminae 16 project into the concavities 34 of the adjacent elastomeric laminae 14. While both the elastomeric laminae 14 and the carbon fiber laminae 16 could be planar, the presence of the concavities and convexities (or another interlocking shape) increases the surface area over which the laminae 14, 16 mutually contact each other and also helps align the laminae 14, 16 and allow the laminae 14, 16 to resist relative radial movement. In many embodiments, approximately 50 of the elastomeric laminae 14 are interleaved with a similar number of carbon fiber laminae 16 to form the elastomeric bearing 10.

Figure 5:
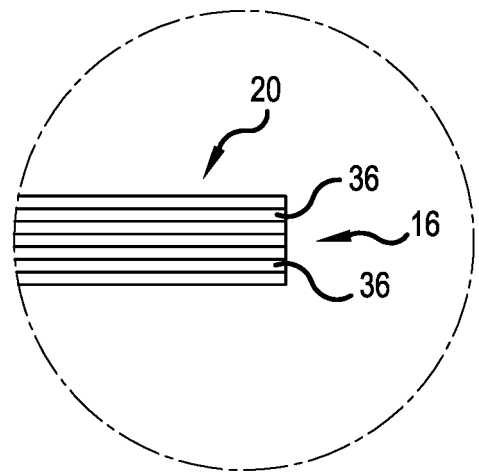
FIG. 5 is a detail view of region V of FIG. 3 showing the individual layers that make up one of the carbon fiber laminae.

In conventional elastomeric bearings, the laminae that are located between adjacent pairs of elastomeric laminae are formed from stainless steel or titanium. Other materials generally lack the strength required to withstand the stresses to which such elastomeric bearings are subjected when used, for example, to support the rotor blades of rotary wing aircraft. Specifically, it has been thought that materials other than stainless steel and titanium could not withstand the 20,000 pounds or more of centrifugal force produced by the rotating blades (a force directed along the axis of the bearing). However, the present inventors have discovered that carbon-fiber impregnated thermoplastics such as PEEK, in particular, multiple sheets 36 (FIG. 5) of the carbon-fiber embedded in PEEK, which sheets may comprise prepregs, provide the compressive strength and resistance to radial and axial movement necessary for use in elastomeric bearings for supporting rotor blades of rotary wing aircraft while allowing the elastomer layers to function in substantially the same manner as in conventional elastomeric bearings that use stainless steel. It has been found that an optimal balance of strength and low weight can be obtained by using from 5 to 9, and more specifically, from 6 to 8, and most preferably exactly 7 of the sheets 36 illustrated in FIG. 5 to form each of the carbon fiber laminae 16. The disclosed arrangement also provides a substantial weight savings. Such carbon fiber laminae 16 can be used to replace the stainless steel laminae of substantially any conventional elastomeric bearing to form an elastomeric bearing according to the present disclosure.

The individual sheets 36 that make up each carbon fiber lamina 16 may comprise tapes or webs of carbon fiber impregnated PEEK where the carbon fibers in each sheet 36 are aligned in a single direction (unidirectional). Preferably the five to nine sheets 36 that make up a carbon fiber lamina 16 are arranged with the fibers of each sheet 36 at a different angle. For example, the sheets 36 may be stacked so that the carbon fibers in one sheet run at a 90 degree angle to the fibers in each adjacent sheet 36. Alternately, the fibers in each sheet 36 may run at a 45 degree angle to the fibers in each adjacent sheet 36. This offset of the fibers in the adjacent sheets 36 increases the overall strength of the elastomeric bearing 10.

Figure 6:
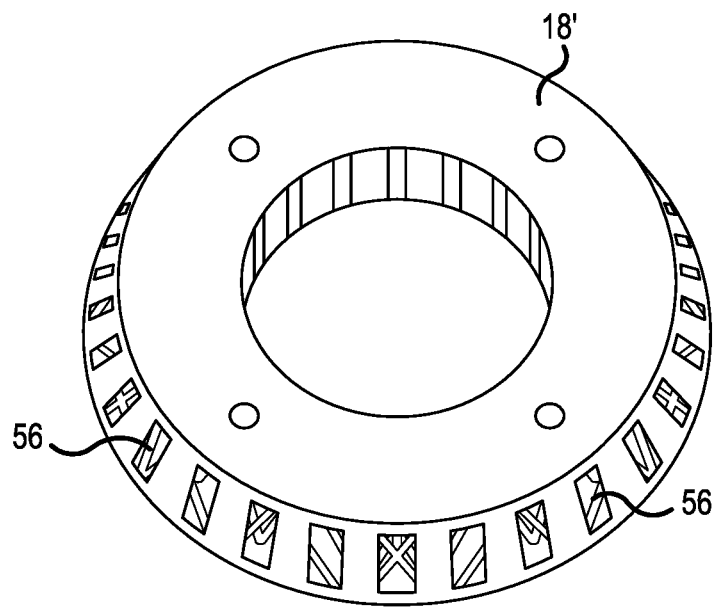
FIG. 6 is a perspective view of an end plate for use in an elastomeric bearing of the type shown in FIG. 1.
Figure 9:
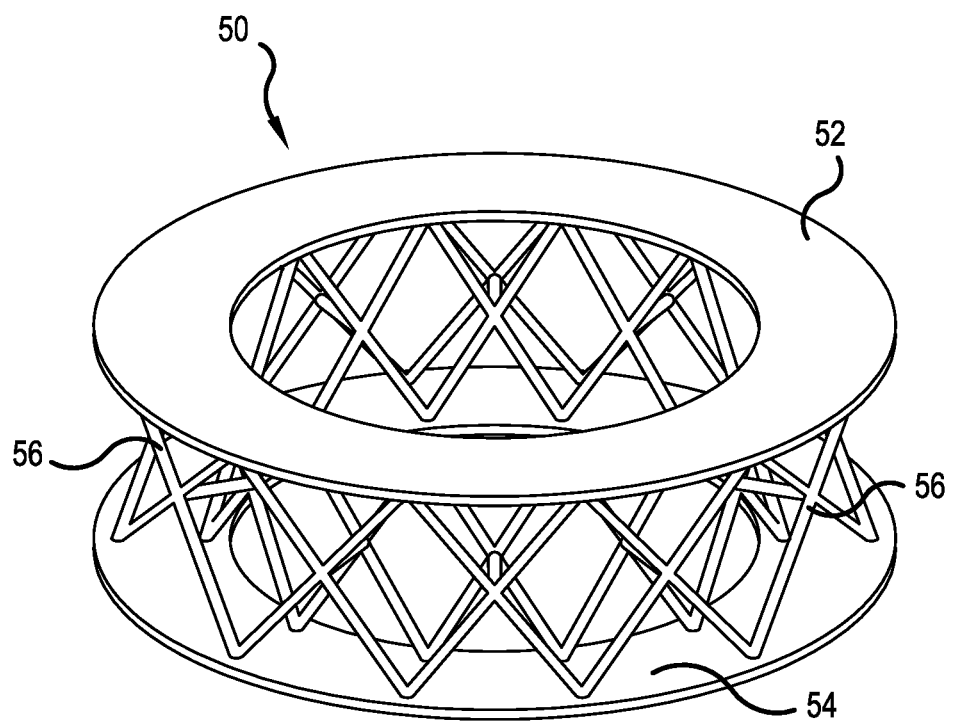
FIG. 9 is a perspective view of an internal structure of the end plate of FIG. 6.

Reference is now made to FIG. 6, showing the end cap 18 and FIG. 9, showing the structure 50 which is located inside the end cap 18 and partly visible in FIG. 6. The structure 50 includes an annular upper support member 52, an annular lower support member 54 and a plurality of struts 56 connecting the upper support member 52 to the lower support member 54, which struts 56 extend at a non-perpendicular angle to the annular upper support member 52 and the annular lower support member 54. The shape and dimensions of the struts 56 and the annular upper and lower support members 52, 54, can be varied based on the application in which a bearing including the lattice 50 is to be used. For example, instead of struts, the interior of the end cap could be formed from a lattice of supports and voids, of substantially any size or shape, either open or closed cell, or have a honeycomb structure.

Forming the end cap 18 with a partially hollow interior instead of casting or otherwise forming the end cap 18 from a solid block of metal significantly reduces the weight of the end cap 18 and that of the bearing 10 itself. The structure 50, and, optionally, all external structures of the end cap 18, can be formed by an additive manufacturing process such as, for example, laser sintering. While manufacturing the end cap 18 from solid bodies of materials lighter than stainless steel has been considered, the use of a laser sintering or other additive manufacturing process allows for the end cap 18 to be formed with interior spaces that make up more than 5% of the interior volume or more than 50% of the interior volume or even as much about 90% of the interior volume of the end cap 18, significantly reducing the weight of the end cap 18.

Suitable materials for forming the end cap include stainless steel and titanium; however the former is generally preferred for reasons of cost. Thus according to this aspect of the disclosure, the weight of the end cap 18 can be reduced significantly without sacrificing the strength required to perform the function of an elastomeric bearing end cap in a support for the rotor blade of a rotary wing aircraft. When such an end cap is used with the novel carbon fiber reinforced laminae 16 described above, a 30-40% weight reduction over conventional elastomeric bearings is possible.

Figure 7:
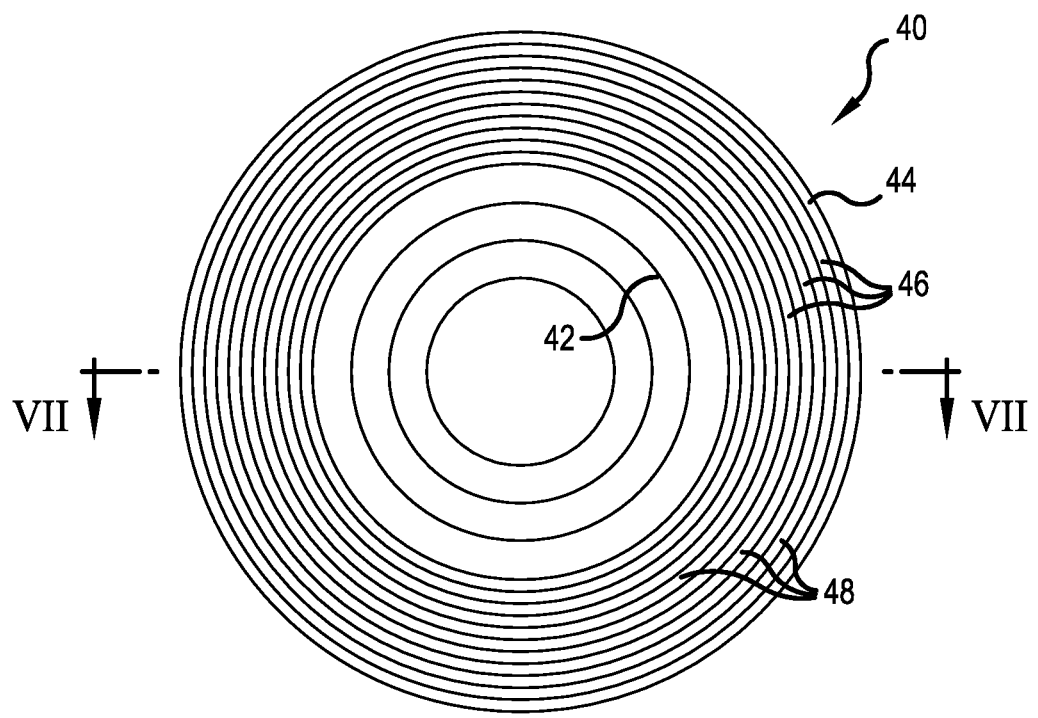
FIG. 7 is a top plan view of an elastomeric bearing having alternating elastomer and carbon fiber layers according to a second embodiment of the present disclosure.
Figure 8:
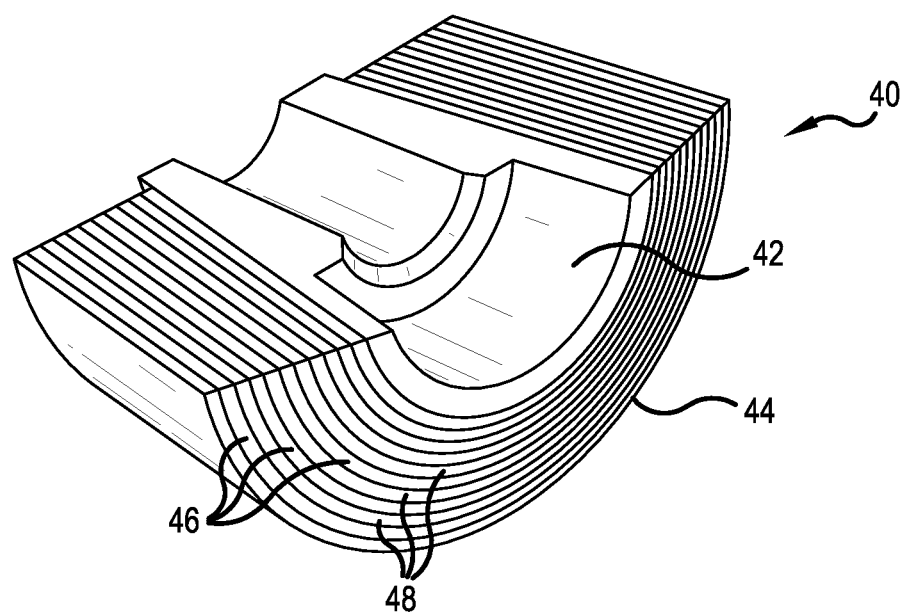
FIG. 8 is a sectional perspective view of the elastomeric bearing of FIG. 7 taken through line VII-VII of FIG. 7.

A second embodiment of the disclosure is shown in FIGS. 7 and 8 which illustrate a second elastomeric bearing 40 that includes an inner race 42, an outer race 44 and a plurality of cylindrical elastomer layers 46 and cylindrical carbon fiber layers 48 that alternate (i.e., are interleaved) between the inner race 42 and the outer race 44. The layers can also be seen in the sectional view of FIG. 8. Rather than the stack of similarly sized laminations disclosed in the first embodiment, the laminations of the elastomeric bearing 40 of the present embodiment comprise nested cylinders, the diameters of which increase from the inner race 42 to the outer race 44. Each carbon fiber layer 48 of the second elastomeric bearing 40 may also be formed of 5 to 9 or 6 to 8 or exactly 7 individual sheets or prepregs formed from a combination of carbon fibers and PEEK, and the elastomeric bearing 40 may include approximately 50 of the elastomer layers 46 interleaved with a similar number of the carbon fiber layers 48.

The present invention has been described herein in terms of preferred embodiments. However, modifications and additions to these embodiments will become apparent to persons of ordinary skill in the relevant art upon a review of the foregoing description. It is therefore intended that all modifications and additions to these embodiments form a part of the present invention to the extent they fall within the scope of the several claims appended hereto.

What is claimed is:

1. An elastomeric bearing comprising:
a first race having an axis of rotation;
a second race coaxially arranged relative to the first race and spaced from the first race by a gap;
a bearing body in the gap connecting the first race to the second race, the bearing body comprising a plurality of first laminae coaxial with the first race and a plurality of second laminae coaxial with the first race, the first laminae being formed from a different material than the second laminae; and
a metal end cap connected to the first race or to the second race,
wherein the metal end cap includes an at least partially hollow interior, and
wherein the interior includes an annular upper support member, an annular lower support member and a plurality of struts extending from the upper support member to the lower support member.

2. The elastomeric bearing according to claim 1, wherein the metal end cap is formed by an additive manufacturing process.

3. The elastomeric bearing according to claim 2, wherein the additive manufacturing process comprises laser sintering.

4. The elastomeric bearing according to claim 1, wherein the plurality of struts are not perpendicular to the annular upper support and are not perpendicular to the annular lower support.

5. The elastomeric bearing according to claim 1,
wherein the annular upper support member has an external diameter and the annular lower support member has a external diameter greater than the external diameter of the upper support member, and
wherein the lower support member is located between the upper annular support member and the plurality of first laminae.

6. The elastomeric bearing according to claim 1, wherein the first laminae comprise elastomeric laminae and the second laminae are carbon fiber reinforced.

7. The elastomeric bearing according to claim 1, wherein the first laminae comprise elastomeric laminae and the second laminae comprise carbon fibers embedded in a thermoplastic.

8. The elastomeric bearing according to claim 7, wherein the thermoplastic comprises polyether ether ketone.

9. The elastomeric bearing according to claim 1,
wherein the annular upper support member comprises an upper plate having a top surface and a bottom surface, and
the annular lower support member comprises a lower plate having a top surface and a bottom surface, and
wherein the plurality of struts extend from the bottom surface of the upper plate to the top surface of the lower plate.

10. The elastomeric bearing according to claim 9, wherein the top surface of the upper plate is connected to the bottom surface of the upper plate by a sidewall.

11. An elastomeric bearing comprising: a first race having an axis of rotation;
a second race coaxially arranged relative to the first race and spaced from the first race by a gap;
a bearing body in the gap connecting the first race to the second race, the bearing body comprising a plurality of elastomeric first laminae coaxial with the first race and a plurality of second laminae coaxial with the first race, the second laminae comprising polyether ether ketone having embedded carbon fibers;
a metal end cap connected to the first race or to the second race, wherein the metal end cap is formed by laser sintering, wherein the metal end cap has an at least partially hollow interior, wherein the interior includes an annular upper support member, an annular lower support member and a plurality of struts extending from the upper support member to the lower support member.

12. The elastomeric bearing according to claim 11, wherein the plurality of struts are not perpendicular to the annular upper support and are not perpendicular to the annular lower support.

13. The elastomeric bearing according to claim 11, wherein the annular upper support member has an external diameter and the annular lower support member has a external diameter greater than the external diameter of the upper support member, and wherein the lower support member is located between the upper annular support member and the plurality of first laminae.

14. An elastomeric bearing comprising:
a first race having an axis of rotation;
a second race coaxially arranged relative to the first race and spaced from the first race by a gap;
a bearing body in the gap connecting the first race to the second race, the bearing body comprising a plurality of elastomeric laminae coaxial with the first race and a plurality of carbon fiber reinforced polyether ether ketone laminae coaxial with the first race; and
a metal end cap connected to the first race or to the second race,
wherein the metal end cap is formed by laser sintering and includes an annular upper support member, an annular lower support member and a plurality of struts extending from the annular upper support member to the annular lower support member,
wherein the plurality of struts are not perpendicular to the annular upper support member and are not perpendicular to the annular lower support member,
wherein the annular upper support member has an external diameter and the annular lower support member has a external diameter greater than the external diameter of the annular upper support member, and
wherein the annular lower support member is located between the annular upper support member and the plurality of first laminae.

* * * * *